(12) United States Patent
Schramm

(10) Patent No.: US 7,806,434 B2
(45) Date of Patent: Oct. 5, 2010

(54) ADAPTIVE AIRBAG GAS FLOW APPARATUS

(75) Inventor: Michael R. Schramm, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 105 days.

(21) Appl. No.: 11/978,295

(22) Filed: Oct. 29, 2007

(65) Prior Publication Data

US 2009/0108573 A1 Apr. 30, 2009

(51) Int. Cl.
 *B60R 21/16* (2006.01)
(52) U.S. Cl. ................... 280/731; 280/740; 280/741
(58) Field of Classification Search ............. 280/731, 280/740, 741
 See application file for complete search history.

(56) References Cited

U.S. PATENT DOCUMENTS

| 4,808,146 | A | 2/1989 | Nogami |
| 4,932,285 | A | 6/1990 | Tsukamoto |
| 6,497,431 | B1 | 12/2002 | Schramm |
| 6,893,044 | B2 * | 5/2005 | Holmes et al. ............. 280/731 |
| 7,048,297 | B2 * | 5/2006 | Schneider ................. 280/728.2 |
| 7,131,661 | B2 * | 11/2006 | Webber et al. ............ 280/728.2 |
| 7,390,018 | B2 * | 6/2008 | Ridolfi et al. ............... 280/731 |
| 7,441,799 | B2 * | 10/2008 | Enders et al. ............... 280/731 |
| 7,481,450 | B2 * | 1/2009 | Hirzmann et al. ........... 280/731 |
| 7,513,527 | B2 * | 4/2009 | Lube et al. ................. 280/736 |

FOREIGN PATENT DOCUMENTS

EP 1 199 243 A1 4/2002

* cited by examiner

*Primary Examiner*—Toan C To
(74) *Attorney, Agent, or Firm*—Sally J Brown; Madson IP, P.C.

(57) ABSTRACT

An airbag gas flow apparatus for a steering wheel includes a housing and a rotatable gas guide positioned within the housing. The housing includes a base and a diffuser, the diffuser comprising at least one opening. The rotatable gas guide includes at least one open portion and a closed portion. A weight is added to the gas guide and is positioned diametrically opposite the closed portion. The weight remains substantially at the 6 o'clock position and the closed portion is positioned substantially at the 12 o'clock position regardless of the rotational position of the steering wheel. As the steering wheel is rotated, the gas guide rotates relative to the housing and readjusts within the apparatus such that the weight remains positioned substantially at the 6 o'clock position and the closed portion remains positioned substantially at the 12 o'clock position.

18 Claims, 5 Drawing Sheets

ADAPTIVE AIRBAG GAS FLOW APPARATUS

BACKGROUND OF THE INVENTION

Driver's airbag systems have been known and used for many years. There systems are generally mounted within the vehicle's steering wheel and are designed to inflate in the event of an accident or crash. The inflating airbag is then positioned between the vehicle driver and the steering wheel to protect the driver from harmful impact with the steering wheel, the dashboard, the windshield, or other portions of the vehicle interior.

In order to inflate an airbag, an inflator and a diffuser is generally used. The inflator is used to produce and/or channel a quantity of inflation gas into the airbag. It is the influx of inflation gas into the airbag that causes the airbag to inflate. Generally, the diffuser is positioned to direct or channel the gas produced by the inflator into the airbag.

In order to channel the gas into the airbag, the diffuser will generally comprise a plurality of holes through which the inflation gas will flow. These holes are generally equally spaced or equally dispersed about the diffuser. By having the holes equally dispersed about the diffuser, the inflation gas will have a variety of different flow paths and will have the ability to inflate the airbag uniformly.

Most driver's airbag systems are designed to provide optimal impact protection for drivers that are in the standard, expected position—e.g, seated in the driver's seat with a seatbelt buckled. Of course, it is entirely possible that, in some crashes, the driver may be "out of position" (or "OOP")—e.g., not in the standard, expected position. Vehicle manufacturers have devoted significant time and energy attempting to construct airbag systems that will provide sufficient impact protection for OOP drivers/vehicle occupants.

In order to protect OOP drivers, it may be desirable, in some situations, to cover some of the airbag diffuser holes. Such covering of these holes would mean that the airbag would no longer inflate uniformly. In other words, some portions of the airbag would inflate more quickly than other portions of the airbag. Depending upon this position of the OOP driver, this may be desirable. For example, if some of the diffuser holes were covered proximate the top of the diffuser module, gas entering the top of the airbag would be restricted such that this area of the airbag would inflate more slowly. Such inflation may be desirable as the airbag would inflate more slowly proximate the head of an OOP occupant.

However, to date there has been no satisfactory means whereby these top diffuser holes would be blocked to protect an OOP occupant. Moreover, even if the top holes were blocked, the steering wheel may rotate during the operation of the vehicle. Thus, when the steering wheel is rotated (such as to turn the vehicle), these blocked holes will no longer be positioned at the "top" of the system.

Accordingly, there is a need in the art for a new type of system that addresses one or more of the above-recited problems. Such a device is disclosed herein.

BRIEF SUMMARY OF THE INVENTION

An airbag gas flow apparatus for a steering wheel is disclosed. The gas flow apparatus comprises a housing and a rotatable gas guide positioned within the housing. The housing may comprise a base and a diffuser portion. The diffuser portion may be referred to as a diffuser. The diffuser portion may comprise at least one opening. The rotatable gas guide comprises at least one open portion and a closed portion. A weight is added to the gas guide and is positioned (at least substantially) diametrically opposite the closed portion.

The weight may be positioned on an outer surface of the rotatable gas guide. The housing may further comprise a housing track, wherein the gas guide can rotate within the track. A coating may also be added to reduce the friction associated with the rotation of the gas guide within the track. An inflator assembly may also be added that is capable of producing a quantity of inflation gas. The inflator assembly may have a filter assembly. The gas filter assembly is capable of filtering a quantity of inflation gas generated by the gas generator during actuation.

In some embodiments, the diffuser is circular and the at least one opening comprises a 12 o'clock opening when the steering wheel is in a home, non-rotated position, the closed portion of the gas guide substantially blocking the 12 o'clock opening on the diffuser. In other embodiments, the weight remains substantially at the 6 o'clock position and the closed portion of the gas guide is positioned substantially at the 12 o'clock position whether the steering wheel is rotated or non-rotated. The apparatus may be designed such that as the steering wheel is rotated, the gas guide rotates relative to the housing (but remains substantially stationary relative to a vehicle within which it may be mounted) and readjusts within the apparatus such that the weight remains positioned substantially at the 6 o'clock position and the closed portion of the gas guide remains positioned substantially at the 12 o'clock position. The gas guide may rotate and readjust based upon gravitational loads placed on the weight.

The present embodiments also teach a gas guide for disposition within an airbag gas flow apparatus for a steering wheel. The gas guide comprises a closed portion and at least one open portion. The gas guide also comprises a weight positioned diametrically opposite the closed portion, wherein the gas guide is rotatable within a circular track in the airbag gas flow apparatus. In some embodiments, the weight remains substantially at the 6 o'clock position and the closed portion is positioned substantially at the 12 o'clock position whether the steering wheel is rotated or non-rotated. In other embodiments, the gas guide is designed such that as the steering wheel is rotated, the gas guide rotates relative to the housing and readjusts within the apparatus such that the weight remains positioned substantially at the 6 o'clock position and the closed portion remains positioned substantially at the 12 o'clock position. Further embodiments are designed such that the weight is positioned on an outer surface of the rotatable gas guide. The gas guide may further comprise a coating that reduces the friction associated with the rotation of the gas guide within the track.

The present embodiments also teach a method for blocking a diffuser opening positioned at a 12 o'clock position when a steering wheel is either rotated or non-rotated is also disclosed. The method comprises the step of obtaining a housing comprising a base and a diffuser, the diffuser comprising at least one opening. The method also includes the step of obtaining a gas guide positioned within the housing, the gas guide comprising at least one open portion and a closed portion, and a weight positioned diametrically opposite the closed portion. The method may additionally include the step of positioning the gas guide within the housing such that the gas guide is capable of rotating within the housing, wherein the weight remains substantially at the 6 o'clock position and the closed portion is positioned substantially at the 12 o'clock position whether the steering wheel is rotated or non-rotated. In other embodiments, the method is designed such that as the steering wheel is rotated, the gas guide rotates and readjusts within the apparatus such that the weight remains positioned substantially at the 6 o'clock position and the closed portion remains positioned substantially at the 12 o'clock position.

The apparatus may include a gas flow apparatus for an airbag assembly or airbag system. The apparatus includes a housing that includes a diffuser and a base. The diffuser and the base are configured to fit together (or "snap" together).

The diffuser may be a substantially hollow dish shaped member having a plurality of gas openings. A circular track may also be added to the diffuser. The base may likewise be a substantially cylindrical or disk shaped member. A circular track may also be added to the base.

A gas generator having a filter assembly that is capable of filtering a quantity of inflation gas generated by the gas generator during actuation may also be added. The gas generator may be positioned within the housing. The generator includes a filter assembly, gas generating material, and an initiator that is capable of igniting the gas generating material. During actuation, the gas generating material will produce the quantity of inflation gas that will flow through the gas filter assembly such that the produced gas is within the housing.

The gas guide may comprise a cylindrical member. This cylindrical member may have at least one closed portion and at least one open portion. The gas produced by ignition of the gas generating material may flow through the open portion(s) of the gas guide and diffuser but may not flow through the closed portion(s) of the gas guide and diffuser. A weight is connected to the gas guide. The weight is positioned opposite the closed portion. Thus if the closed portion is positioned at the "12 o'clock" position, the weight will be positioned opposite—i.e., at the 6 o'clock position.

The gas guide is designed such that it will fit into the housing track. More specifically, the gas guide is capable of rotating when it is fit into the housing track. The housing track and/or portions of the gas guide may be coated with Teflon® or other like material having a substantially low coefficient of friction. The purpose of this coating is to reduce the friction to facilitate the rotation of the gas guide within the housing track.

When positioned within the housing, the gas guide is free to rotate within the housing track formed in the base and/or in the diffuser. In practice, the adaptive airbag gas flow apparatus is mounted in a driver type airbag module and the module is mounted within a steering wheel of a vehicle. When the assembly is thus mounted, due to the gravitation pull on the gas guide weight, the gas guide will automatically reposition itself such that the weight is in a lower position (e.g., 6 o'clock position) and the closed portion is in an upper position (e.g., the 12 o'clock position). The closed portion thus blocks the holes in the diffuser proximate the 12 o'clock position, thereby preventing gas from flowing through these openings during deployment.

When the apparatus is rotated (such as by rotating the steering wheel to turn the vehicle) the gas guide will rotate within the housing track. This rotation will occur under the pull of gravity such that the weight returns to the 6 o'clock position and the closed portion returns to the 12 o'clock position. The gas guide will thus be readjusted under the pull of gravity on the weight commensurate with the rotation of the steering wheel, regardless of whether the steering wheel is rotated 90 degrees 180 degrees, 270 degrees, or any other degree of rotation. Thus, the closed portion will always be adjusted such that it is positioned at the top of the housing.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of embodiments of the invention.

Figure 1:
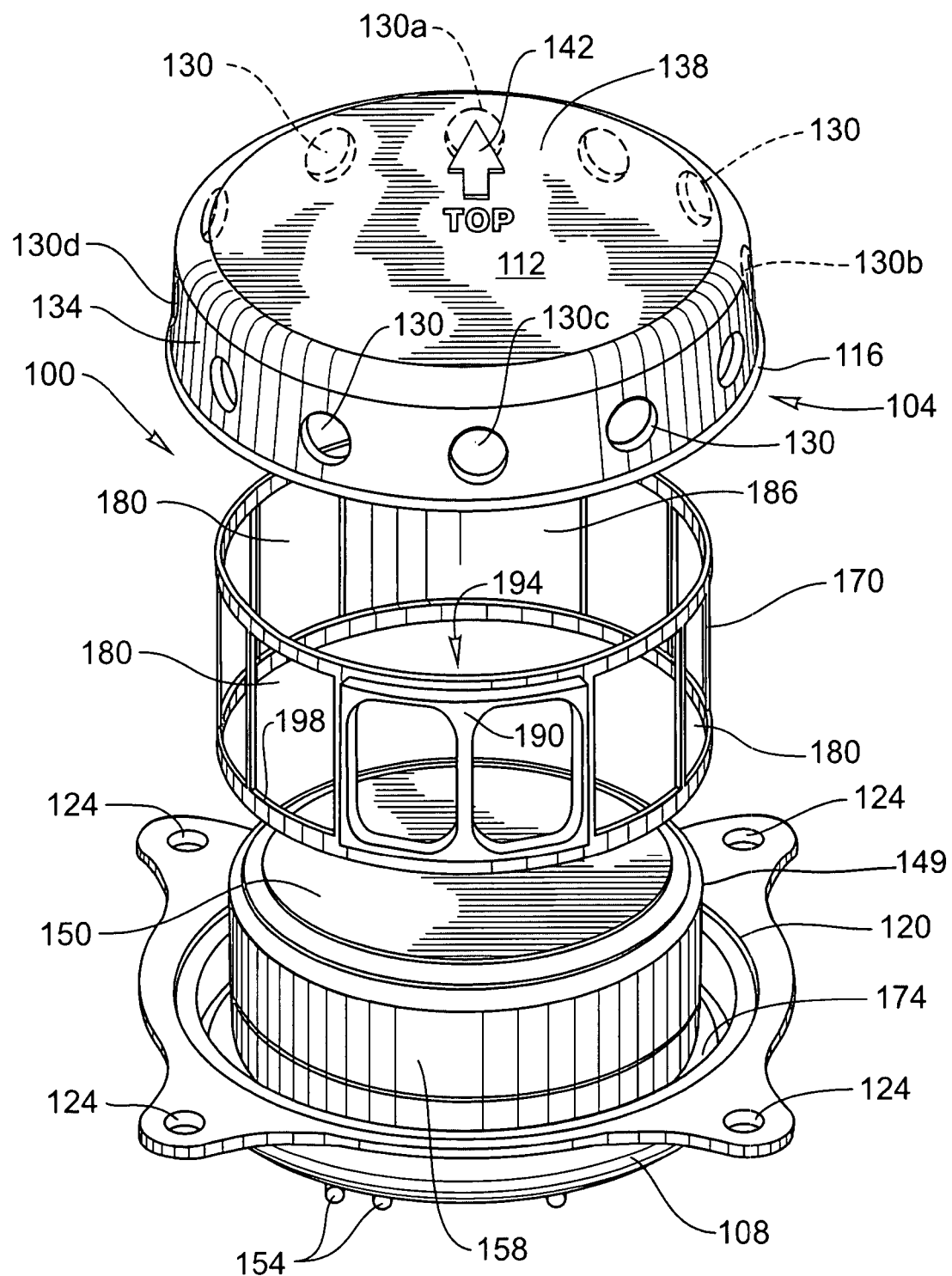
FIG. 1 is an exploded isometric view of a gas flow apparatus according to the present embodiments.

Referring now to FIG. 1, an airbag gas flow apparatus 100 is illustrated. FIG. 1 is an exploded isometric view of a gas flow apparatus 100. The gas flow apparatus 100 may be used as part of a driver's airbag system. More specifically, the gas flow apparatus 100 may be positioned within a vehicle's steering wheel (not shown) proximate an airbag (not shown). During deployment of the airbag, inflation gas will flow through the gas flow apparatus 100 and enter the airbag. This influx of gas operates to inflate and deploy the airbag into a position that provide impact protection to the vehicle driver. The particular size and configuration of the airbag and steering wheel that may be used will be readily appreciated by those skilled in the art. Accordingly, for purposes of brevity, a description of these conventional features will be omitted.

The gas flow apparatus 100 includes a housing 104. The housing 104 may be constructed of plastic, thermoplastic, vinyl, metal, or other similar materials. The housing 104 may be comprised of two distinct pieces, a base 108 and a diffuser 112. The diffuser 112 may be a hollow dish-shaped member. Likewise, the base 108 may also comprise a hollow disk-shaped member. Generally, the base 108 and the diffuser 112 are designed such that they can "snap" or fit together to form a closed container. To this end, the diffuser 112 may comprise a lip 116 and the base 108 may comprise a ledge 120 that engages the lip 116 to hold the base 108 and the diffuser 112 together. In other embodiments, the ledge 120 may be added to the diffuser 112 and the lip 116 may be added to the base 108. Of course, other mechanisms/means for engaging the base 108 and the diffuser 112 may also be used.

As shown in FIG. 1, the base 108 may include one or more fastener holes 124. The fastener holes 124 are designed to receive a fastener (not shown). As is known in the art, the fastener passes through the fastener holes 124 and operates to secure the gas flow apparatus 100 to the steering wheel, the airbag, or other portions of the airbag system.

The diffuser 112 may also include at least one opening 130. As can be seen in FIG. 1, more than one opening 130 may be used. Specifically, in the embodiment shown in FIG. 1, the diffuser 112 has a plurality of openings positioned/disposed on an outer wall 134 of the diffuser 112. More specifically, there are a plurality of openings 130 that are disposed proximate where the numbers are located on a round clock. Thus, opening 130a represents the "top" or "12 o'clock opening," opening 130b is the "far right" or "3 o'clock" opening, opening 130c is the "bottom" or "6 o'clock" opening, opening 130d is the "far left" or "9 o'clock" opening, etc. The other locations of the openings 130 may correspond to the positions of the other numerals on a clock. Of course, the embodiment shown in FIG. 1 includes only twelve (12) openings 130. Other embodiments, may be designed in which a different number of openings 130 are actually used.

The upper surface 138 of the diffuser 112 is illustrated with an orientation indicia 142 which is illustrated for clarity in understanding the present embodiments. As shown in FIG. 1, the orientation indicia 142 is an arrow with the word "TOP," thereby indicating the appropriate orientation of the apparatus 100 It should be noted that the indicia 142 is only added for illustrative purposes for understanding the present embodiments. In actual production, the indicia 142 may be omitted. In fact, as will be explained herein, one of the advantages of the present embodiments is that the gas guide will reposition itself into the proper orientation, regardless of the orientation of the inflator/housing. Thus, the need for the installer to orient the diffuser 112 in a particular position is eliminated. However, it should be noted that embodiments may be produced in which an orientation indicia 142 is added to the diffuser 112.

The apparatus 100 may also include an inflator assembly 149 that is capable of producing a quantity of inflation gas during deployment. The inflator assembly 149 may be an inflator or other similar device that operates to deploy an airbag by producing a quantity of inflation gas. Those skilled in the art will appreciate how to obtain/construct the inflator assembly 149.

The gas flow apparatus 100 may further include a gas filter assembly 150. The gas filter assembly 150 may be part of the inflator assembly 149. The gas filter assembly 150 is capable of producing and filtering a quantity of inflation gas during actuation. Those of skill in the art will appreciate how this may be accomplished. Specifically, the inflator assembly 149 may comprise a chamber (not shown) housing a quantity of gas generating material (not shown) and/or a quantity of stored inflation gas. When actuation occurs, a quantity of inflation gas (which was stored in the chamber and/or produced by ignition of the gas generating material) exits the inflator assembly 149 and will ultimately be channeled into the airbag to effectuate inflation/deployment. An initiator (not shown) may also be used to initiate the actuation. This initiator may include one or more pins 154 that will connect the airbag system to a sensor, control unit, or other device that senses the crash and sends an electrical signal that actuates the system and causes the airbag to inflate. The gas filter assembly 150 may comprise a filter 158 that operates to filter the inflation gas to remove any particles and/or undesirable byproducts produced by the inflator assembly 149.

The gas filter assembly 150 is designed such that it may be positioned within the housing 104. Accordingly, when the filter assembly 150 is positioned within the housing 104, the inflation gas produced during actuation will escape the housing 104 by passing through the openings 130 in the diffuser 112. Once the gas has passed through these openings 130, the gas will be channeled into the airbag.

Figure 5:
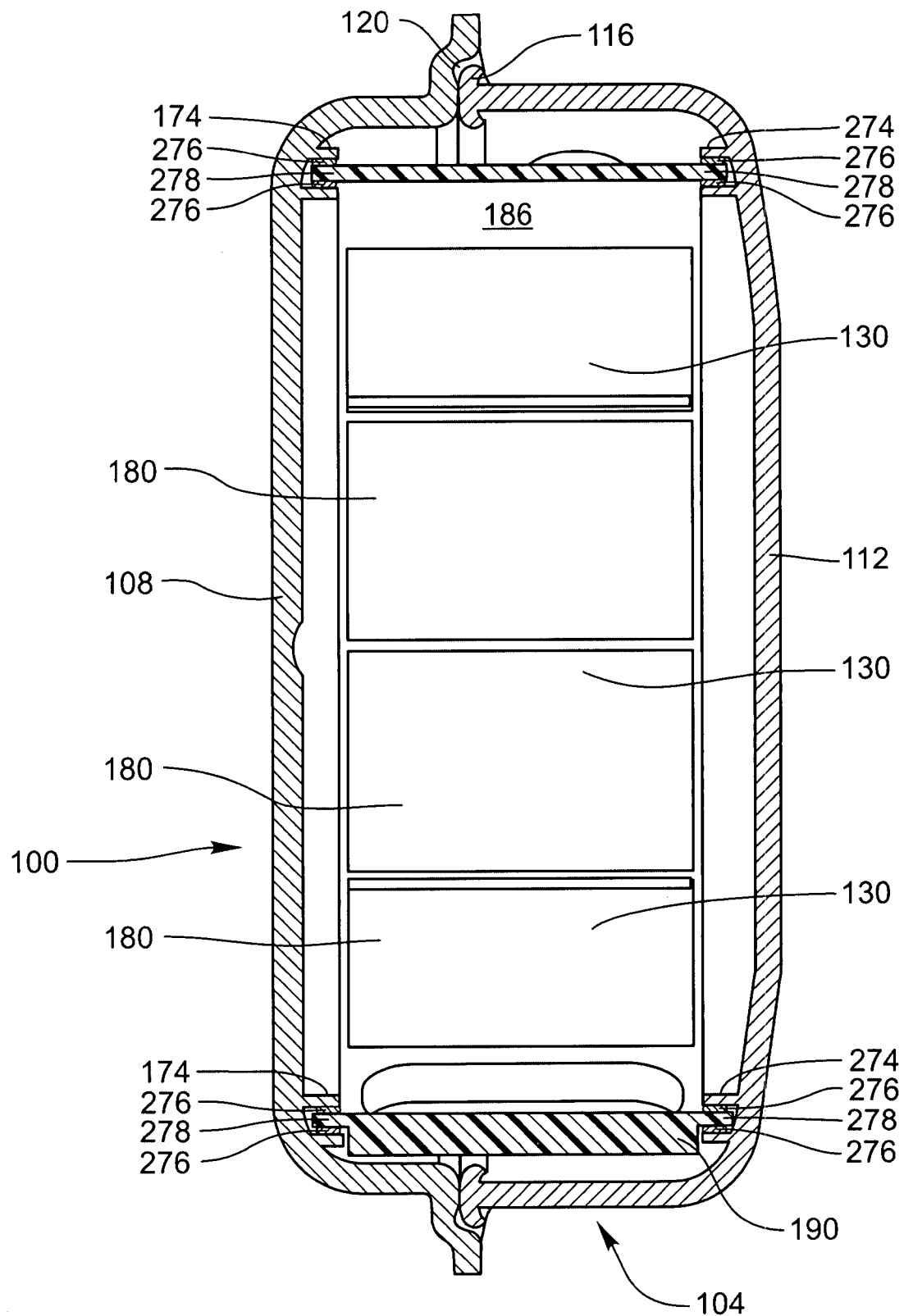
FIG. 5 is a sectional view of the apparatus of FIG. 2 taken along the line 5-5.

The gas flow apparatus 100 may further include a gas guide 170 positioned within the housing 104. The gas guide 170 may be a cylindrical member that circumscribes and/or encircles the filter assembly 150. The gas guide 170 is designed to fit in a housing trick 174 positioned in the housing 104. The housing track 174 may be added to the base 108 and comprise a groove, channel or raceway into which the gas guide 170 may fit and rotate. As shown in FIG. 5, a corresponding track may also be added to the diffuser 112 as well. In other embodiments, the gas guide 170 may comprise pins, dowels, tabs, extensions, or other similar members that will extend into the housing track 174 (and/or the track in the diffuser 112) to further the engagement between the gas guide 170 and the housing 104. Although the gas guide 170 is shown as being cylindrical in shape, other shapes and/or configurations for the gas guide 170 are also possible.

The gas guide 170 is rotatable, meaning that it may rotate within the housing 104. In some embodiments, the gas guide 170 is capable of freely rotating within the housing 104 and/or within the housing track 174. Accordingly, a coating may be added. The coating may be Teflon® or other like material having a substantially low coefficient of friction. The purpose of this coating is to reduce the friction to facilitate the rotation of the gas guide 170 within the housing track 174/housing 104. In some embodiments, the housing track 174 (or the track in the diffuser) or the areas of the gas guide 170 that interface with the track may include the coating. Other embodiments may be designed in which both the track and the gas guide 170 includes the coating.

The gas guide 170 will now be described in greater detail. The gas guide 170 comprises a cylindrical "cage" or "mesh." (This portion may also be referred to as a "squirrel cage.") Accordingly, the gas guide 170 comprises one or more open portions 180. These open portions 180 are openings, apertures, etc. in the gas guide 170. In some embodiments, the open portion 180 will be larger than the size of the openings 130. However, other embodiments may be designed in which the size of the open portion 180 more closely matches the size of the openings 130. When the inflation gas is produced during actuation, the inflation gas is capable of flowing through the open portions 180. The gas guide 170 further comprises a closed portion 186. More than one closed portion 186 may also be used. The closed portion 186 is a solid portion of the gas guide 170. Accordingly, when the inflation gas is produced during actuation, the inflation gas is not capable of flowing through the closed portion 186.

The gas guide 170 also includes a weight 190. The weight 190 is positioned diametrically opposite the closed portion 186. As used herein, "diametrically opposite" means that, with respect to a center 194 of the gas guide 170, the closed portion 186 and the weight 190 are positioned on opposite sides of the center 194.

In the embodiment of FIG. 1, the weight 190 is positioned on an outer surface 198 of the rotatable gas guide 170. In other embodiments, the weight 190 could be attached to an inner surface of the gas guide 170 such that the weight 190 becomes positioned between the gas guide 170 and the filter assembly 150. Other configurations and positions for the weight are also possible.

In some embodiments, the gas guide 170 is formed from substantially thin low density or light weight material such as aluminum sheet. At the same time, the weight 190 is preferably formed from high density or heavy weight material such as steel or cast iron. Of course, other materials may also be used.

Figure 2:
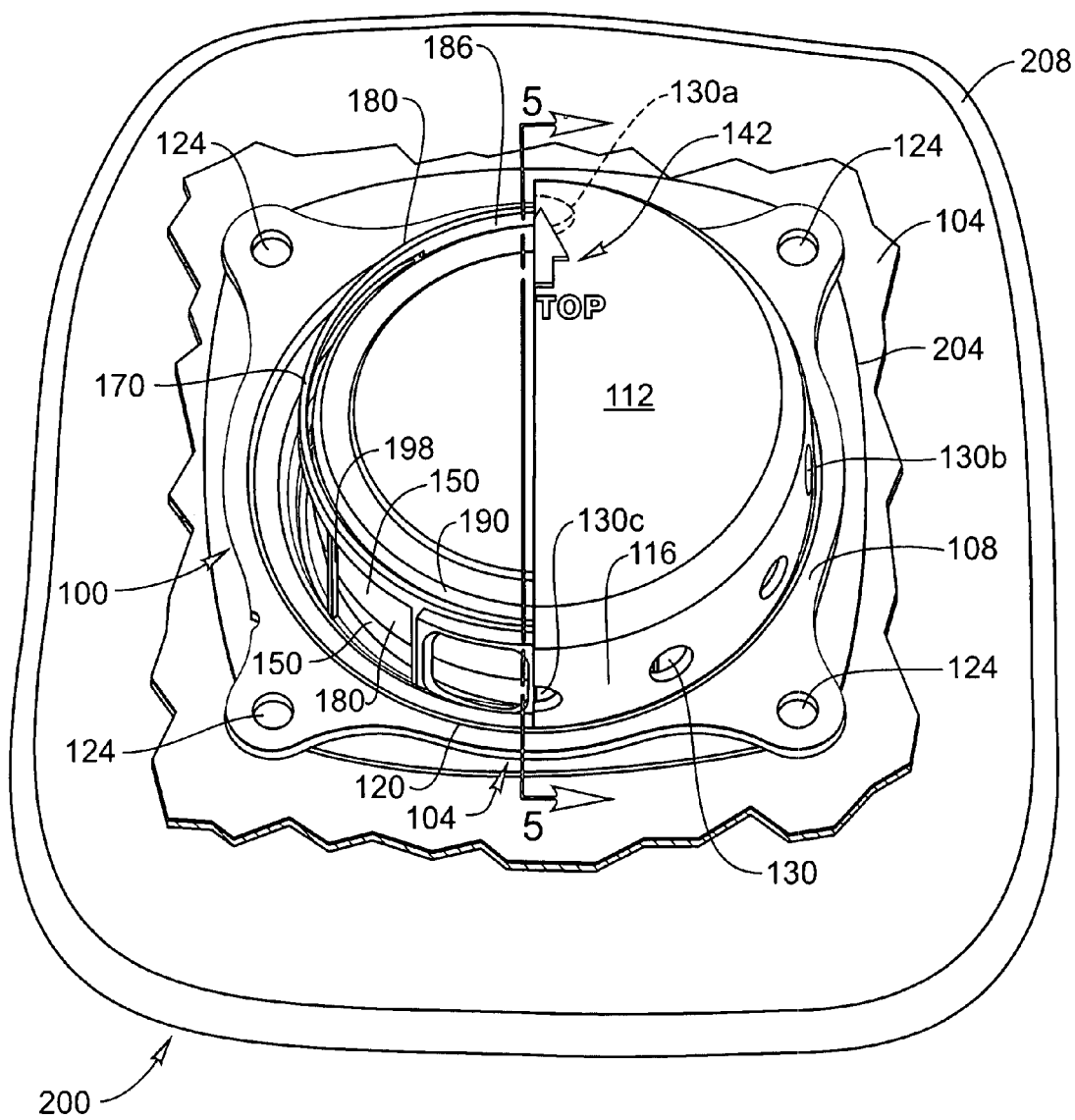
FIG. 2 is a partially cutaway, assembled isometric view of the apparatus of FIG. 1, wherein the apparatus is shown substantially in the orientation in which the apparatus would be oriented when installed in a vehicle.

Referring now to FIG. 2, an assembly view of the apparatus 100 of FIG. 1 is illustrated. As can be seen in FIG. 2, the assembly 100 is shown positioned on a steering wheel 200. The steering wheel 200 includes a hub 204 surrounded by an outer rim 208. The assembly 100 will be positioned on the hub 204 of the steering wheel 200. Those skilled in the art will appreciate how the apparatus 100 may be secured to the hub 204. In some embodiments, this may involve passing fasteners (not shown) through the holes 124. Other methods for securing the apparatus 100 may also be used. Further, as in known in the art, the fastener may also be used to secure the apparatus 100 to an airbag (not shown).

In FIG. 2, the lip 116 engages the ledge 120 to connect the diffuser 112 to the base 108. However, for purposes of clarity, a portion of the diffuser 112 has been partially cutaway so that inner portions of apparatus 100 are visible. In FIG. 2, the steering wheel 200 is shown in a "home" or "non-rotated" position. (This position allows the vehicle to proceed straight ahead). As shown in FIG. 2, when the steering wheel 200 is in the home, non-rotated position, the weight 190 is positioned at the bottom of the apparatus 100—i.e., proximate the 6 o'clock opening 130c. Likewise, when the steering wheel 200 is in the home, non-rotated position, the closed portion 186 is positioned at the top of the apparatus 100—i.e., proximate the 12 o'clock opening 130a. As explained above, inflation gas cannot flow through the closed portion 186. When the steering wheel 200 is in a home, non-rotated position, the closed portion 186 blocks or substantially blocks the 12 o'clock opening 130a on the diffuser 112. In other words, the closed portion 186 blocks the 12 o'clock opening 130a on the diffuser 112 such that, if the apparatus 100 is actuated when the steering wheel 200 is in the home, non-rotated position, the inflation gas is prevented from flowing through the 12 o'clock opening 130a. Such position occurs because of the gravitational pull on the weight 190 moves the weight 190 to the bottom (or 6 o'clock) position of the apparatus 100.

Figure 3:
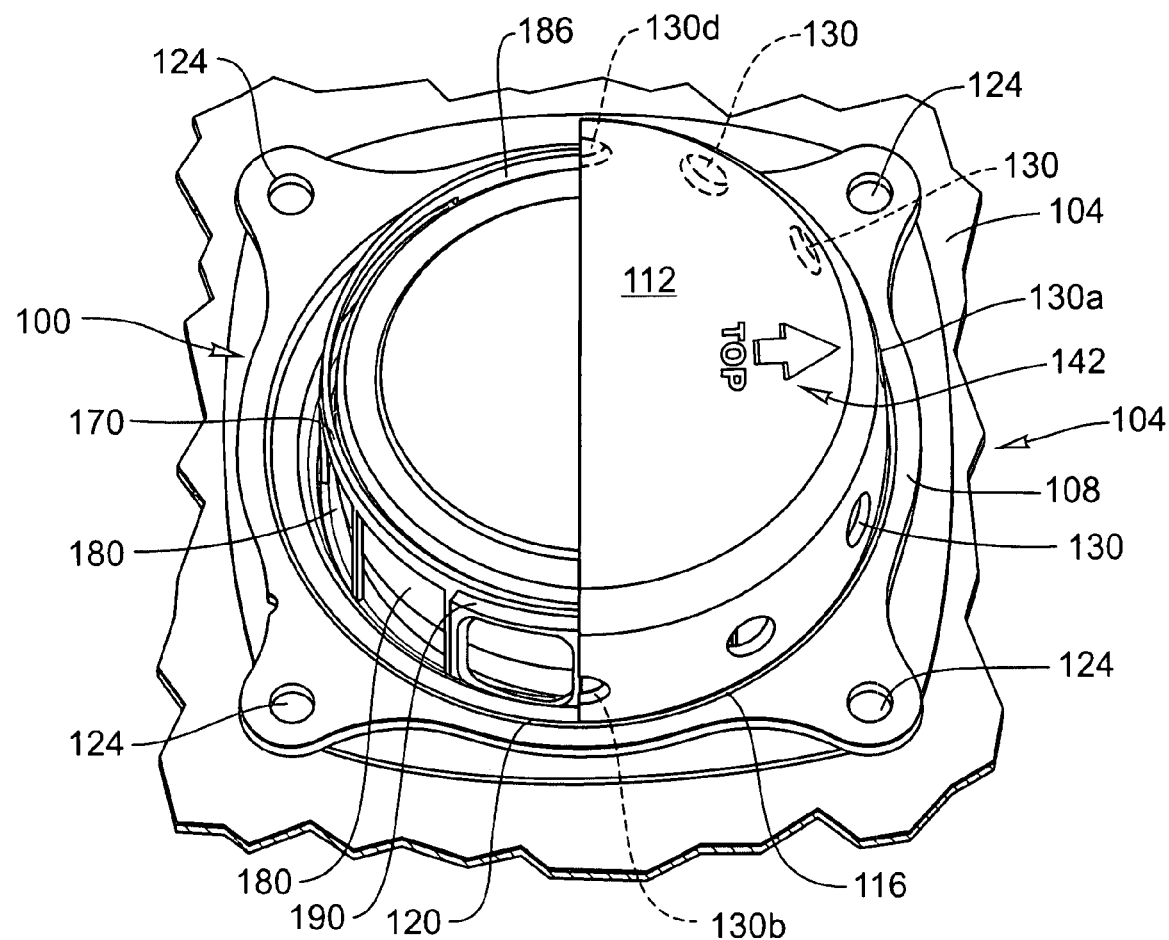
FIG. 3 is a partially cutaway, assembled isometric view of the apparatus of FIG. 2 in which the apparatus has been rotated 90 degrees to the right.

FIG. 3 is a partially cutaway, assembled view of the apparatus 100 of FIG. 2. However, the difference between FIG. 2 and FIG. 3 is that, in FIG. 3, the apparatus 100 has been rotated 90 degrees to the right (i.e., towards the "3 o'clock" position). Such rotation of the apparatus 100 has occurred by the vehicle driver moving the steering wheel 200. Such movement of the steering wheel 200 (shown in FIG. 2) will occur during operation of the vehicle, such as when the driver desires to make a "right turn."

Even though the steering wheel 200 has been rotated, the weight 190 remains proximate the 6 o'clock position (i.e., at the position of the numeral "6" on the standard clock) and the closed portion 186 is proximate the 12 o'clock position (i.e., at the position of the numeral "12" on the standard clock). This occurs due to rotation of the gas guide 170. As explained above, the gas guide 170 is rotatable (or freely rotatable) within the housing 104. Thus, as the steering wheel 200 is rotated, the gas guide 170 automatically readjusts and rotates (relative to housing 104 under the pull of gravity) in the opposition direction to reposition the weight 190, thereby maintaining the weight 190 at the bottom (i.e., 6 o'clock) position. Such movement of the weight 190, in turn, maintains the position of the closed portion 186 such that the closed portion 186 remains at the 12 o'clock position, despite the rotation of the steering wheel 200.

Figure 4:
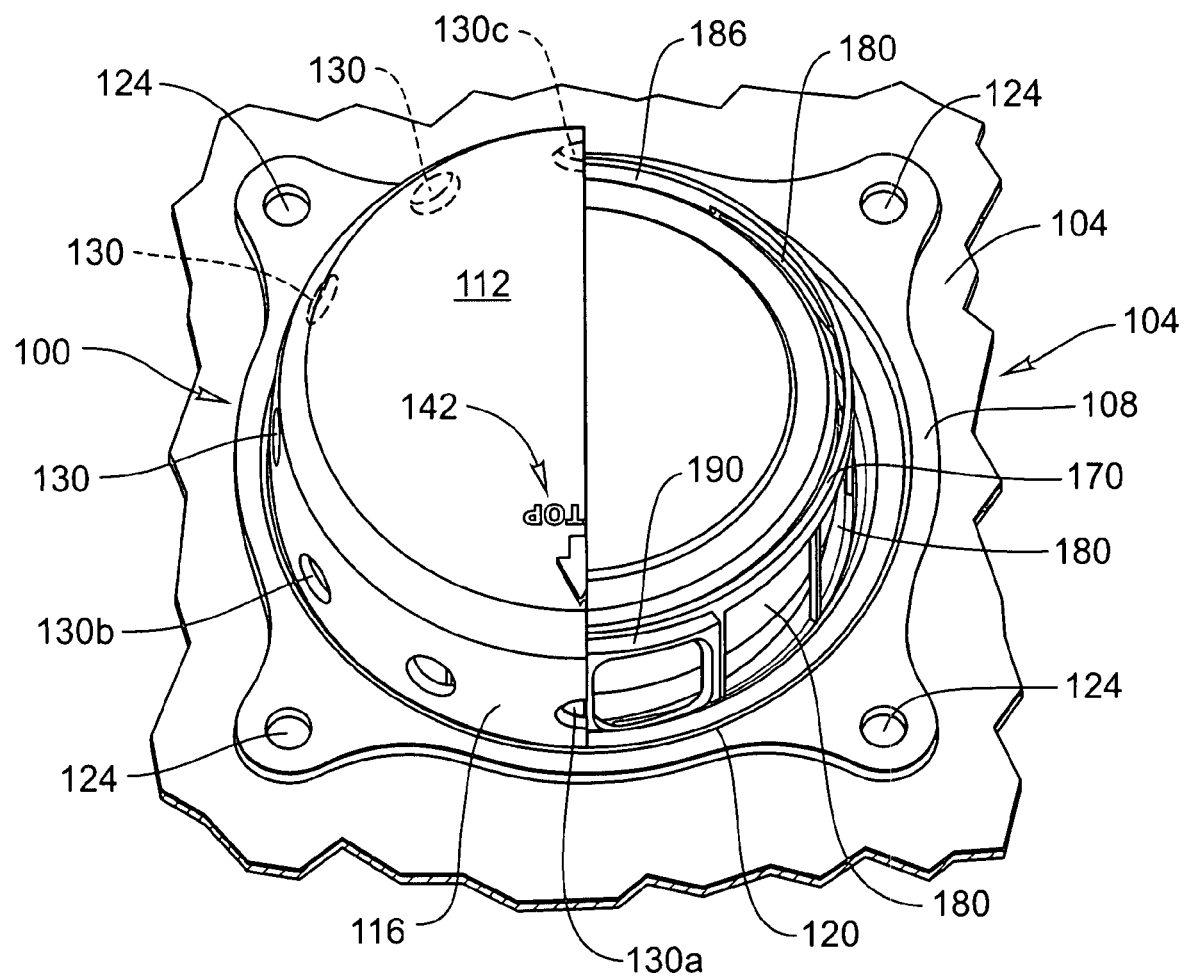
FIG. 4 is a partially cutaway, assembled isometric view of the apparatus of FIG. 2 in which the apparatus has been rotated 180 degrees to the right.

FIG. 4 is a partially cutaway, assembled view of the apparatus 100 of FIG. 2. However, the difference between FIG. 2 and FIG. 4 is that, in FIG. 4, the apparatus 100 has been rotated 180 degrees. (Accordingly, the indicia 142 is now facing downward.) Such rotation of the apparatus 100 has occurred by the vehicle driver moving the steering wheel 200. Such movement of the steering wheel 200 (shown in FIG. 2) will occur during operation of the vehicle.

Even though the steering wheel 200 has been rotated, the weight 190 remains proximate the 6 o'clock position (i.e., at the position of the numeral "6" on the standard clock) and the closed portion 186 is proximate the 12 o'clock position (i.e., at the position of the numeral "12" on the standard clock). Again, this occurs due to rotation of the gas guide 170. As explained above, the gas guide 170 is rotatable (or freely rotatable) within the housing 104. Thus, as the steering wheel 200 is rotated, the gas guide 170 automatically readjusts and rotates (relative to housing 104 under the pull of gravity) in the opposite direction to reposition the weight 190, thereby maintaining the weight 190 at the bottom (i.e., 6 o'clock) position. Such movement of the weight 190, in turn, maintains the position of the closed portion 186 such that the closed portion 186 remains at the 12 o'clock position, despite the rotation of the steering wheel 200.

As can be seen from FIGS. 3 and 4, the gas guide 170 will rotate and readjust to ensure that the weight 190 remains positioned at the 6 o'clock position, regardless of how the steering wheel 200 is rotated. The steering wheel 200 may be rotated in any direction or any amount of degrees (50 degrees, 270 degrees, etc.) and the gas guide 170 will be re-adjusted on an on-going basis commensurate with the rotation of the steering wheel 200, thereby ensuring that the weight 190 remains positioned substantially at the 6 o'clock position and the closed portion 186 remains positioned substantially at the 12 o'clock position.

As can be seen in FIGS. 3 and 4, such readjustment via rotation of the gas guide 170 may be advantageous. Regardless of the position or rotation of the steering wheel 200, the closed portion 186 remains at substantially the 12 o'clock position—i.e., at the top of the apparatus 100. The closed portion 186 blocks or closes the openings 130 and prevents gas from flowing through the particular opening 130 proximate the closed portion 186. By blocking the diffuser openings 130 at the top of the apparatus 100, the flow of gas entering the top of the airbag would be restricted such that this area of the airbag would inflate more slowly. This type of inflation may be desirable as the airbag would inflate more slowly proximate the head of an OOP occupant and the airbag would inflate more quickly near the lower portion of steering wheel rim 208 to provide "lower rim coverage". It does not matter whether the steering wheel is in its rotated or non-rotated position, the openings at the top 12 o'clock position of the apparatus 100 are blocked by the closed portion 186 and the OOP occupant is thus protected.

FIG. 5 is a cross-sectional view taken along the line 5-5 of FIG. 2. FIG. 5 shows the way in which the closed portion operates to block or substantially block the opening 130 at the 12 o'clock position. It should be noted that, in some embodiments, the closed portion 186 will not completely block the proximate opening 130. Rather, the opening 130 is substantially blocked such that the rate through which the inflation gas may pass through this opening 130 is substantially reduced.

FIG. 5 also illustrates the housing track 174 that is added to the base 108 as well as the housing track 274 added to the diffuser 112. Both the housing track 174 and the track 274 may be circular. However, other configurations are also possible. A coating 276 may be added to the housing track 174 and/or the housing track 274 to reduce friction and to further facilitate rotation of the gas guide 170 within the housing track 174/274. As explained above, this coating 276 may be Teflon® or other like material having a substantially low coefficient of friction. In some embodiments, the coating 276 may be added to the edge 278 of the gas guide 170. In other embodiments, the coating 276 is added is added to the edge 278, the housing track 174, and/or the housing track 274. In other embodiments, the housing tracks 174, 274 could be moved outward (i.e., closer to the diffuser 112) so as to create a better seal between the closed portion 186 and the diffuser gas openings 130.

Referring now to all of the Figures generally, those skilled in the art will appreciate that the present embodiments also relate to a method for blocking a diffuser opening 130 positioned at a 12 o'clock position when a steering wheel 200 is either rotated or non-rotated. This method includes the step of obtaining a housing 104. The housing 104 comprises a base 108 and a diffuser 112, wherein the diffuser 112 comprising at least one opening 130. The method also includes the step of obtaining a gas guide 170 positioned within the housing 104, wherein the gas guide 170 comprises at least one open portion 180, a closed portion 186, and a weight 190 positioned diametrically opposite the closed portion 186. The method further includes the step of positioning the gas guide 170 within the housing 104 such that the gas guide 170 is capable rotating within the housing 104, wherein the weight 190 remains substantially at the 6 o'clock position and the closed portion 186 is positioned substantially at the 12 o'clock position whether the steering wheel 200 is rotated or non-rotated. In other embodiments, the method will be designed such that as the steering wheel 200 is rotated, the gas guide 170 rotates and readjusts within the apparatus 100 such that the weight 190 remains positioned substantially at the 6 o'clock position and the closed portion remains positioned substantially at the 12 o'clock position.

It should also be noted another embodiment may be made. Specifically, rather than incorporating the gas guide 170 within an inflator as disclosed above, the gas guide 170 mechanism could be built into an airbag module in a fashion similar to that disclosed by Schramm in U.S. Pat. No. 6,497, 431, except that the gas guide would still be repositioned based on the gravitational loading of the weight 190. (U.S. Pat. No. 6,497,431 is expressly incorporated herein by reference.)

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag gas flow apparatus for a steering wheel comprising:
   a housing, said housing including a diffuser portion having at least one opening; and
   a rotatable gas guide positioned within the housing, the gas guide comprising:
      at least one open portion and a closed portion; and
      a weight positioned substantially diametrically opposite the closed portion,
      wherein the gas guide rotates and readjusts based upon gravitational loads placed on the weight.

2. An airbag gas flow apparatus as in claim 1 wherein the weight is positioned on an outer surface of the gas guide.

3. An airbag gas flow apparatus as in claim 1 wherein the housing is circular and the at least one opening comprises a 12 o'clock opening when the steering wheel is in a home, non-rotated position, the closed portion substantially blocking the 12 o'clock opening.

4. An airbag gas flow apparatus as in claim 1 wherein the housing further comprises a housing track, wherein the gas guide can rotate within the track.

5. An airbag gas flow apparatus as in claim 4 further comprising a coating that reduces the friction associated with the rotation of the gas guide within the track.

6. An airbag gas flow apparatus as in claim 4 further comprising a base, wherein both the base and the diffuser portion include a housing track.

7. An airbag gas flow apparatus as in claim 1 further comprising an inflator assembly that is capable of producing a quantity of inflation gas during actuation, wherein the inflator assembly includes a filter assembly that is capable of filtering the produced inflation gas.

8. An airbag gas flow apparatus as in claim 7 wherein the inflator assembly is positioned interior of the gas guide.

9. An airbag gas flow apparatus as in claim 1, wherein the weight remains substantially at the 6 o'clock position and the closed portion is positioned substantially at the 12 o'clock position regardless of the rotational position of a steering wheel.

10. An airbag gas flow apparatus as in claim 7 wherein as the steering wheel is rotated, the gas guide rotates relative to said housing and readjusts within the apparatus such that the weight remains positioned substantially at the 6 o'clock position and the closed portion remains positioned substantially at the 12 o'clock position.

11. A gas guide for a steering wheel, the gas guide comprising:
   a closed portion and at least one open portion; and
   a weight positioned substantially diametrically opposite the closed portion, wherein the gas guide is rotatable within a circular track and wherein the weight remains substantially at the 6 o'clock position and the closed portion is positioned substantially at the 12 o'clock position regardless of the rotational position of a steering wheel.

12. A gas guide as in claim 11 wherein as the steering wheel is rotated, the gas guide rotates and readjusts within the apparatus such that the weight remains positioned substantially at the 6 o'clock position and the closed portion remains positioned substantially at the 12 o'clock position.

13. A gas guide as in claim 11 wherein the weight is positioned on an outer surface of the rotatable gas guide, the gas guide further comprising a coating that reduces the friction associated with the rotation of the gas guide within the track.

14. A gas guide for a steering wheel, the gas guide comprising:
   a closed portion and at least one open portion; and
   a weight positioned substantially diametrically opposite the closed portion, wherein the gas guide is rotatable within a circular track and wherein the gas guide is designed to be positioned exterior of an inflator assembly.

15. A method for blocking a diffuser opening positioned at a 12 o'clock position regardless of a steering wheel rotational position, the method comprising:
   obtaining a housing, said housing including a diffuser portion having at least one opening; and
   obtaining a gas guide positioned within the housing, the gas guide comprising:
      at least one open portion and a closed portion; and
      a weight positioned diametrically opposite the closed portion; and
   positioning the gas guide within the housing such that the gas guide is capable rotating within the housing, wherein the weight remains substantially at the 6 o'clock position and the closed portion is positioned substantially at the 12 o'clock position regardless of the rotational position of the steering wheel.

16. A method as in claim 15 wherein as the steering wheel is rotated, the gas guide rotates and readjusts such that the weight remains positioned substantially at the 6 o'clock position and the closed portion remains positioned substantially at the 12 o'clock position.

17. A method as in claim 15 wherein the gas guide rotates within the housing due to gravitational loads placed on the weight.

18. A method as in claim 15 further comprising the step of adding a coating to the housing to reduce the friction associated with rotation of the gas guide within the housing.

* * * * *